United States Patent
Wang et al.

(10) Patent No.: US 10,876,751 B2
(45) Date of Patent: Dec. 29, 2020

(54) INTELLIGENT FINITE-STATE MACHINE REMOTE CONTROL SYSTEM FOR AIR-CONDITIONING EQUIPMENT

(71) Applicant: DELTA ELECTRONICS, INC., Taoyuan (TW)

(72) Inventors: Zi-Hao Wang, Taoyuan (TW); Yuan-Ping Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 492 days.

(21) Appl. No.: 15/816,575

(22) Filed: Nov. 17, 2017

(65) Prior Publication Data
US 2018/0266717 A1 Sep. 20, 2018

Related U.S. Application Data

(60) Provisional application No. 62/473,621, filed on Mar. 20, 2017.

(51) Int. Cl.
| | | |
|---|---|---|
| F24F 11/00 | (2018.01) | |
| G05B 13/02 | (2006.01) | |
| F24F 11/30 | (2018.01) | |
| F24F 11/56 | (2018.01) | |
| F24F 11/62 | (2018.01) | |
| F24F 11/63 | (2018.01) | |

(Continued)

(52) U.S. Cl.
CPC .............. F24F 11/30 (2018.01); F24F 11/56 (2018.01); F24F 11/62 (2018.01);
(Continued)

(58) Field of Classification Search
CPC .............. F24F 11/006; F24F 2011/0068; F24F 2011/0061; F24F 2011/0058; F24F 11/62;
(Continued)

(56) References Cited

U.S. PATENT DOCUMENTS

| | | | |
|---|---|---|---|
| 7,117,043 B1* | 10/2006 | Frederick | G05B 19/056 700/21 |
| 2004/0143823 A1* | 7/2004 | Wei | H04L 67/142 717/140 |

(Continued)

FOREIGN PATENT DOCUMENTS

TW 200527886 A 8/2005

OTHER PUBLICATIONS

Taiwan Office Action issued in corresponding Taiwan Application No. 106130914, dated Jun. 28, 2018, pp. 1-5.

*Primary Examiner* — Rocio Del Mar Perez-Velez
*Assistant Examiner* — Olvin Lopez Alvarez
(74) *Attorney, Agent, or Firm* — Hauptman Ham, LLP (57) ABSTRACT

A finite-state machine control system including a cloud control platform, a state machine executor module, an intelligent control system (ICS) and air-conditioning equipment is disclosed. The cloud control platform receives a state-machine definition text-file written by and uploaded from a user terminal. The state-machine executor module transforms a description content of the state-machine definition text-file into mechanical execution codes which is compatible with the air-conditioning equipment, and executes the mechanical execution codes for creating a finite state-machine. The ICS controls the air-conditioning equipment according to the created finite state-machine. The present invention allows a finite-state machine of air-conditioning equipment to be created via the state machine definition text-file written by the user or generated automatically via computer programs and algorithms, thus the user doesn't need to have the ability of writing the machine execution codes.

14 Claims, 7 Drawing Sheets

(51) Int. Cl.
*F24F 130/10* (2018.01)
*F24F 130/00* (2018.01)
*F24F 11/64* (2018.01)
*F24F 11/58* (2018.01)

(52) U.S. Cl.
CPC .......... G05B 13/0265 (2013.01); *F24F 11/58* (2018.01); *F24F 11/63* (2018.01); *F24F 11/64* (2018.01); *F24F 2130/00* (2018.01); *F24F 2130/10* (2018.01)

(58) Field of Classification Search
CPC .. F24F 11/30; F24F 11/56; F24F 11/64; F24F 2130/00; F24F 2131/10; F24F 11/63; G05B 13/0265
See application file for complete search history.

(56) References Cited

U.S. PATENT DOCUMENTS

| | | | | |
|---|---|---|---|---|
| 2005/0028137 | A1* | 2/2005 | Evans | G06F 8/48 717/110 |
| 2007/0044066 | A1* | 2/2007 | Meijer | G06F 8/33 717/100 |
| 2008/0179409 | A1* | 7/2008 | Seem | F24F 11/0001 236/49.3 |
| 2009/0083719 | A1* | 3/2009 | Hsieh | G06F 8/44 717/140 |
| 2009/0113402 | A1* | 4/2009 | Chen | G06F 8/41 717/140 |
| 2014/0180445 | A1* | 6/2014 | Gardiner | G06F 40/40 700/83 |
| 2014/0280528 | A1* | 9/2014 | Brandes | G06F 15/177 709/204 |
| 2014/0324232 | A1* | 10/2014 | Modi | G05D 23/1931 700/278 |
| 2015/0154012 | A1* | 6/2015 | Wolfram | H04L 67/10 717/176 |
| 2015/0167998 | A1* | 6/2015 | Saffre | F24F 11/30 700/276 |
| 2017/0048280 | A1* | 2/2017 | Logue | H04L 12/2818 |
| 2017/0132194 | A1* | 5/2017 | Lee | G06F 40/18 |
| 2017/0206615 | A1* | 7/2017 | Sloop | G06Q 50/06 |
| 2018/0013579 | A1* | 1/2018 | Fairweather | H04L 67/125 |
| 2018/0195752 | A1* | 7/2018 | Sasaki | F24F 11/64 |
| 2020/0080903 | A1* | 3/2020 | Lange | G01K 17/20 |

* cited by examiner

INTELLIGENT FINITE-STATE MACHINE REMOTE CONTROL SYSTEM FOR AIR-CONDITIONING EQUIPMENT

BACKGROUND OF THE INVENTION

Field of the Invention

The present invention relates to a control system for an air-conditioning equipment, in particular relates to an intelligent finite-state machine remote control system for the air-conditioning equipment.

Description of Prior Art

An electronic apparatus typically is operated under multiple states, and each state respectively has own specific switch conditions. Air-conditioning equipment, for example, may operate under an air-conditioning ON mode, an air-conditioning OFF mode, an air supply ON mode, an air supply OFF mode, a fan ON mode, a fan OFF mode, etc. Generally, creating a finite-state machine is used to set up the controlling and switching mechanism among the above mentioned operation modes of an electronic apparatus.

Figure 1:
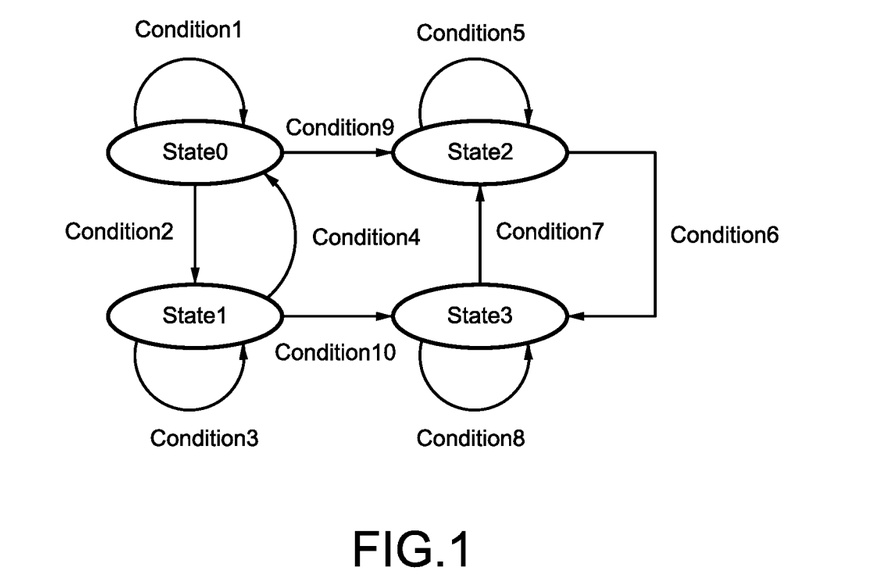
FIG. 1 is a schematic diagram of a finite-state machine in related art.

FIG. 1 is a schematic diagram of a finite-state machine in related art. In the embodiment shown in FIG. 1, an electronic apparatus has four states (for example the state 0, state 1, state 2 and state 3 are used in FIG. 1), and each state respectively has different switching conditions.

If a finite-state machine of the electronic apparatus is defined as the example shown in FIG. 1, the electronic apparatus enters into the state 0 when a condition 1 is meet, switches from the state 0 to the state 1 when a condition 2 is meet, maintains as the state 1 when a condition 3 is meet, switches from the state 1 to the state 0 when a condition 4 is meet, enters into the state 2 when a condition 5 is meet, switches from the state 2 to the state 3 when a condition 6 is meet, switches from the state 3 to the state 2 when a condition 7 is meet, maintains as the state 3 when a condition 8 is meet, switches from the state 0 to the state 2 when a condition 9 is meet, and switches from the state 1 to the state 3 when a condition 10 is meet.

Generally speaking, specific program languages (for example C/C++, Java, Python) are used to directly write each state and each switching condition in mechanical execution codes (for example firmware of electronic apparatuses) for controlling the electronic apparatus in order to define a finite-state machine. Modifying the finite-state machine of the electronic apparatus (for example to increase, decrease states or modify switching conditions) requires re-writing or modifying mechanical execution codes with the above mentioned program language. Therefore, the update and maintenance cost of the electronic apparatus may be considerably high.

Next, a general user may not have the writing and modifying ability of the mentioned program languages and is passively allowed to accept the predetermined finite-state machine rather than customize the required states and switching conditions. In terms of the above issue, the control systems currently available are inflexible to users and may be inconvenient to users when using electronic apparatuses.

SUMMARY OF THE INVENTION

The objective of the present invention is to provide an intelligent finite-state machine remote control system for an air-conditioning equipment, wherein a user is allowed to directly create a finite-state machine of the air-conditioning equipment with simple text writing, and the user do not need to have the writing ability of mechanical execution codes adapted by the air-conditioning equipment.

In order to achieve the above mentioned objective, a finite-state machine control system is provided which comprises a cloud control platform, a state machine executor module, an intelligent control system (ICS) and air-conditioning equipment. The cloud control platform receives a state-machine definition text-file written by a user from a user terminal. The state-machine executor module translates a description content of the state-machine definition text-file into mechanical execution codes which is compatible with the air-conditioning equipment, and executes the mechanical execution codes for creating a finite state-machine. The ICS therefore controls the air-conditioning equipment according to the created finite state-machine.

Compare to the related arts, the technical advantage provided by the present invention is that: Users are not required to learn the program languages corresponding to the mechanical execution codes of air-conditioning equipment and allowed to use simple texts to define the required multiple states and switching conditions among the states, which are automatically transformed by the system for creating corresponding finite-state machine enabling the operation of the air-conditioning equipment to meet the user's requirements and deliver convenient usages.

In addition, when the user needs to modify the finite-state machine of the air-conditioning equipment, the user only needs to modify the above mentioned text definition without modifying the mechanical execution codes of the air-conditioning equipment. Thus, the maintenance criteria and the cost of air-conditioning equipment are significantly reduced.

Also, in response to the rapid development of artificial intelligence technology, the finite state machine definition text-file may also be automatically and systematically generated via machine learning algorithms by a computer program to satisfy the optimizing requirements of control methods.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 2:
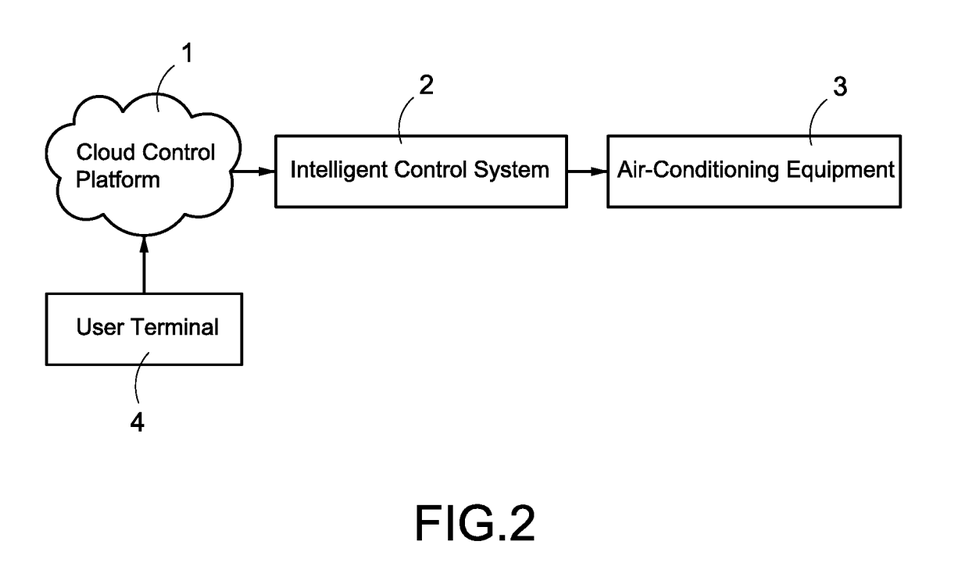
FIG. 2 is a control system architecture diagram according to the first embodiment of the present invention.

FIG. 2 is a control system architecture diagram according to the first embodiment of the present invention. A finite-state machine control system for air-conditioning equipment (referred as control system in the following) is disclosed. The control system receives the text file written by an user or automatically generated by a computer program and algorithms, automatically transforms the content of the text file into mechanical execution codes compatible with an electronic apparatus in the area network (for example air-conditioning equipment), and automatically creates a corresponding finite-state machine according to the transformed mechanical execution codes. Thus, the user is allowed to directly set up the finite-state machine of the control system with simple texts, which means, the user does not need to have writing ability of corresponding program languages (for example C/C++, Java, Python etc.) used by the mechanical execution codes of the electronic apparatus.

As shown in FIG. 2, the control system of the present invention includes a cloud control platform 1, an intelligent control system (ICS) 2, and at least one air-conditioning equipment 3, wherein the intelligent control system 2 is electrically connected to the air-conditioning equipment 3, which is used for perform intelligent control on the air-conditioning equipment 3.

In an embodiment, the cloud control platform 1 operates in a cloud server, the intelligent control system 2 and the air-conditioning equipment 3 are installed on local end, and connects to the cloud control platform 1 via a network system (for example, Internet, LAN, WLAN, etc.). In another embodiment, the cloud control platform 1, the intelligent control system 2 and the air-conditioning equipment 3 are all installed at local end, and inter-connected with each other via a wired or wireless matter.

Figure 3:
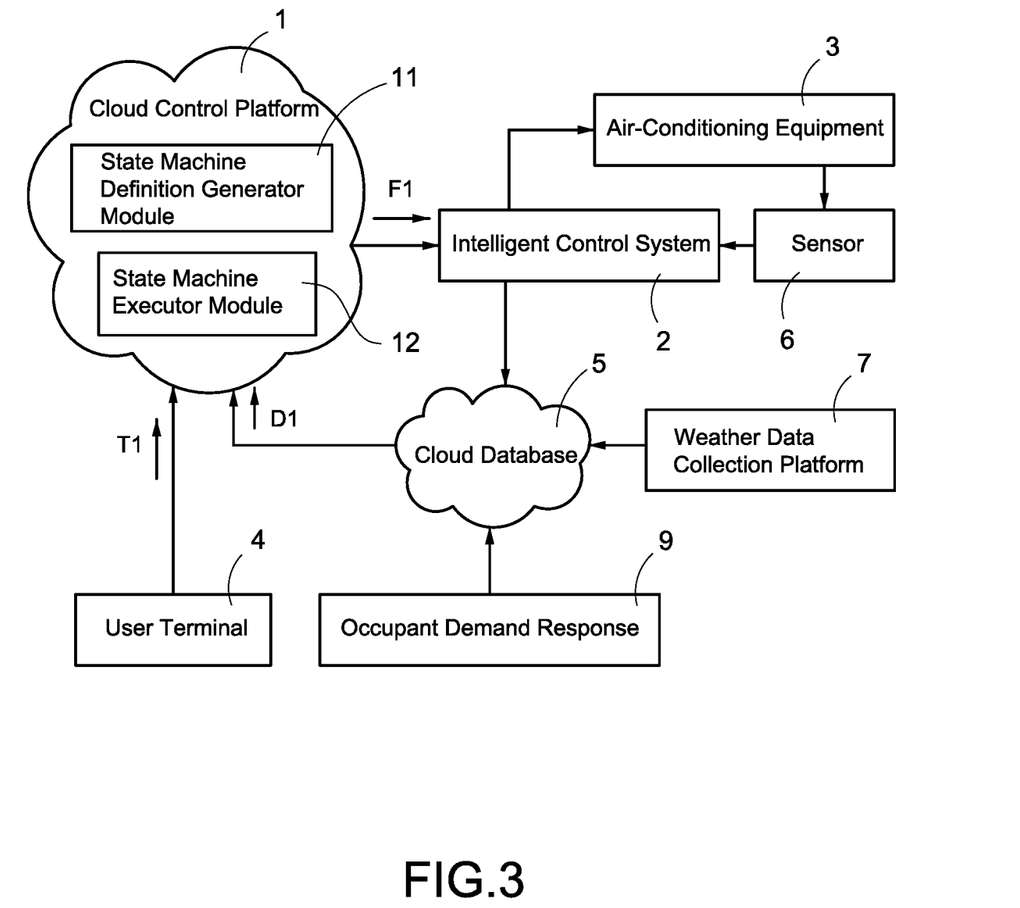
FIG. 3 is a control system architecture diagram according to the second embodiment of the present invention.

FIG. 3 is a control system architecture diagram according to the second embodiment of the present invention. As shown in FIG. 3, the control system of the present invention also includes a state machine definition generator module 11 and a state machine executor module 12.

As shown in FIG. 3, the cloud control platform 1 connects to the user terminal 4 controlled by the user via the network system, and receives the uploaded state machine definition text-file T1 from the user terminal 4. In the embodiment, the description content of the state machine definition text-file T1 records at least two states and the switching conditions of the at least two states (for example records "state 0", "state 1", "switch from state 0 to state 1 when the condition 1 is meet", and "switch from state 1 to state 0 when the condition 2 is meet"). In another embodiment, the description content of the state machine definition text-file T1 may be contents directly recording specific control actions executed on the air-conditioning equipment 3 at specific time points (for example, "turning on the air-conditioning equipment 3 on a first time point", "turning off the air-conditioning equipment 3 on a second time point", etc.).

In the embodiment shown in FIG. 3, the state machine executor module 12 is installed on the cloud control platform 1. In this embodiment, the state machine executor module 12 processes the state machine definition text-file T1 that received by the cloud control platform 1, and transforms the description content of the state machine definition text-file T1 to the mechanical execution codes compatible with the air-conditioning equipment 3 which is controlled by the cloud control platform 1.

After transforming the description content of the state machine definition text-file T1 into the mechanical execution codes, the state machine executor module 12 further executes the mechanical execution codes to create a finite-state machine F1 corresponding to the description content (i.e. The above mentioned states and conditions). When the finite-state machine F1 is created, the intelligent control system 2 connects to the cloud control platform 1 via network system (for example Internet, LAN, WLAN etc.) to use the finite-state machine F1 operated by the cloud control platform 1 as a reference, and performs intelligent control on the connected air-conditioning equipment 3 according to the finite-state machine F1.

Specifically, the mechanical execution codes are generated via the state machine executor module 12 compiling the description content of the state machine definition text-file T1, so the created finite-state machine F1 (for example the finite-state machine shown in FIG. 6B) matches the description content of the state machine definition text-file T1. Thus, the intelligent control system 2 assures that the operations of the air-conditioning equipment 3 meet user's requirements (i.e., meet the description content of the state machine definition text-file T1).

Figure 4:
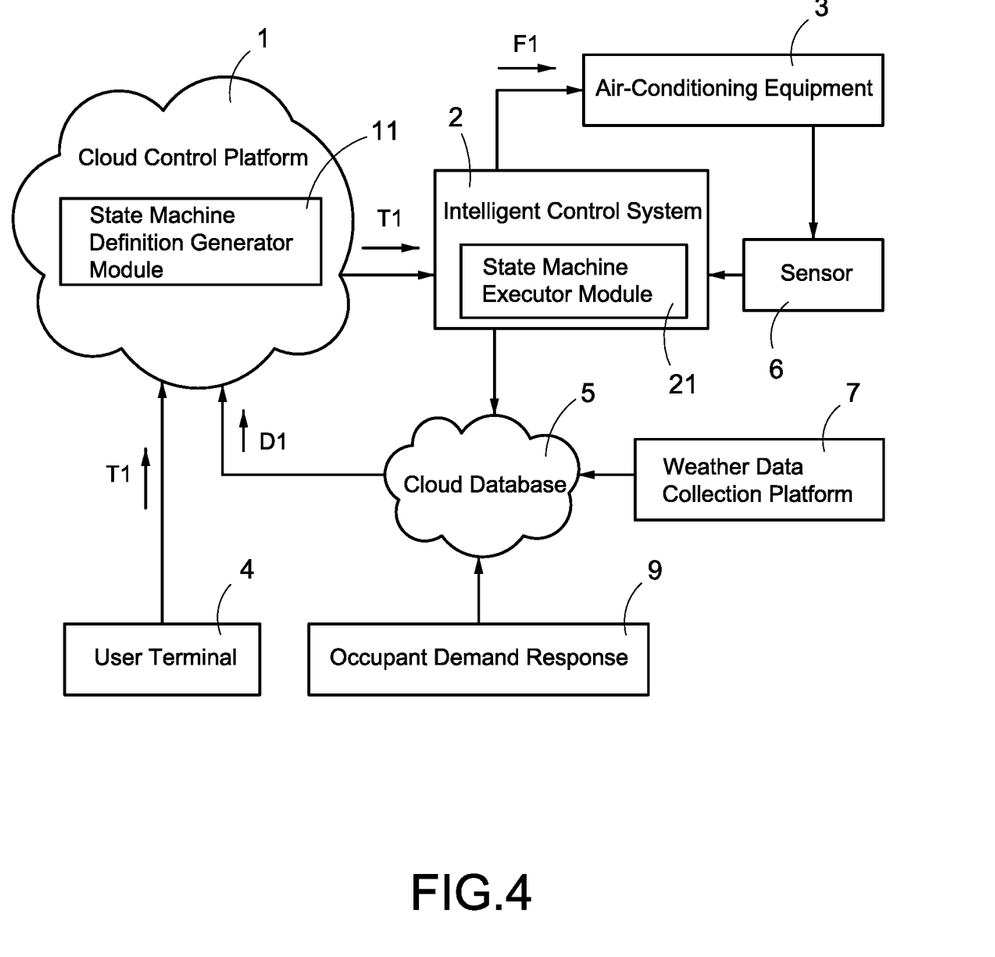
FIG. 4 is a control system architecture diagram according to the third embodiment of the present invention.

FIG. 4 is a control system architecture diagram according to the third embodiment of the present invention. A control system shown in FIG. 4 is similar to the control system shown in FIG. 3, wherein the difference is the state machine executor module is installed on the intelligent control system 2 (i.e., the state machine executor module 21 shown in FIG. 4) in the embodiment shown in FIG. 4.

In an embodiment, the state machine executor module includes a first state machine executor module arranged in the cloud control platform 1 and a second state machine executor module arranged in the intelligent control system 2, and the control system may determine whether the first state machine executor module or the second state machine executor module processes the state machine definition text-file T1 according to the description content of the state machine definition text-file T1.

For example, the cloud control platform 1 is installed on a cloud server. Therefore, the first state machine executor module of the cloud control platform 1 can simultaneously processes multiple state machine definition text-files T1 and creates multiple finite-state machines at the same time. Thus, the cloud control platform 1 is capable of simultaneously operating multiple finite-state machines for multiple different electronic apparatuses. On the other hand, the intelligent control system 2 is installed at the local end and directly connects to the air-conditioning equipment 3 to control. Therefore, if the second state machine executor module of the intelligent control system 2 is in charge for processing the state machine definition text-file T1 and creating the corresponding finite-state machine, the control sensibility may be enhanced.

Refer to FIG. 4. If the state machine executor module 21 is installed on the intelligent control system 2, the intelligent control system 2 may directly obtain the state machine definition text-file T1 from the cloud control platform 1 after the user terminal 4 uploads the state machine definition text-file T1 written by the user to the cloud control platform 1.

Next, the state machine executor module 21 processes the state machine definition text-file T1 obtained from the intelligent control system 2, and transforms the description content of the state machine definition text-file T1 to the mechanical execution codes compatible with the air-conditioning equipment 3 connected to the intelligent control system 2. In addition, the state machine executor module 21 further executes the transformed mechanical execution codes to create the corresponding finite-state machine F1. Thus, the intelligent control system 2 performs intelligent control on the connected air-conditioning equipment 3 according to the created finite-state machine F1 so as to assure that the operations of the air-conditioning equipment 3 meet user's requirements (i.e., meet the description content of the state machine definition text-file T1).

In an embodiment according to the present invention, the state machine definition text-file T1, for example, is based on an Extensible Markup Language (XML) format. In another embodiment according to the present invention, the state machine definition text-file T1, for example, is based on a JavaScript Object Notation (JSON) format. Nonetheless, the above mentioned are the embodiments implemented according to the present invention but the scope of the invention is not limited thereto.

In an embodiment, the user terminal 4 is, for example, a personal computer or a laptop computer, wherein a user may edit or write the state machine definition text-file T1 via a browser or other editing interfaces (such as editing applications for XML files or JSON files) of the user terminal 4. In another embodiment, the user terminal 4, for example, is a smart mobile device, wherein a user may edit or write the state machine definition text-file T1 via specific applications installed on the user terminal 4.

As shown in FIGS. 3 and 4, the control system of the present invention also includes the state machine definition generator module 11 installed on the cloud control platform 1. The state machine definition generator module 11 receives—external reference data D1 via network systems and automatically generates or updates the state machine definition text-file T1 according to the reference data D1. In other words, the state machine definition text-file T1 may be automatically and systematically generated via machine learning algorithms by a computer program to satisfy users' optimizing requirements of control methods.

Specifically, the state machine definition generator module 11 is trained on line or off line (for example, machine learning), and pre-setup with multiple rules. When the control system imports the received reference data D1 to the state machine definition generator module 11, the state machine definition generator module 11 may automatically generate or update the corresponding multiple states and the switching conditions of each state according to the rules in order to automatically generate or update the state machine definition text-file T1. Therefore, the users do not need to write the state machine definition text-file T1 by their own, which makes the disclosed control systems more convenient and useful.

As shown in FIGS. 3 and 4, the control system of the present invention further includes a cloud database 5. The cloud database 5 may be installed on a cloud server same or different from the cloud server where the cloud control platform 1 is installed, and connected to the cloud control platform 1 via a wired or wireless connection. In the disclosed control system, the reference data D1 is saved in the cloud database 5. The cloud database 5 provides the reference data D1 to the cloud control platform 1. The state machine definition generator module 11 automatically generates or updates the state machine definition text-file T1 with the reference data D1.

In an embodiment, the reference data D1 is permanently saved in the cloud database 5 (for example the geographical location information of the corresponding air-conditioning equipment 3). In another embodiment, the reference data D1 is temporarily saved in the cloud database 5 (for example the daily temperature, humidity, rainfall information, etc.), and can be updated and deleted regularly.

In an embodiment, the control system further includes a sensor 6 (for example a temperature sensor, a humidity sensor, a people detector, an infrared sensor, etc.) installed on the same area as the air-conditioning equipment 3. The sensor 6 is used for sensing the environment where the air-conditioning equipment 3 is located and generates corresponding sensor data. In the embodiment, the sensor 6 returns the sensor data to the intelligent control system 2 and the intelligent control system 2 transfers the sensor data to save in the cloud database 5. Thus, the cloud database 5 uses the sensor data as part of the reference data D1, and the state machine definition generator module 11 may use the sensor data as a basis to generate the state machine definition text-file T1.

In another embodiment, the cloud database 5 also connects to a weather data collection platform 7 to receive weather data (for example temperature, humidity, rainfall, barometric pressure, etc., of each place), and may use the weather data as part of the reference data D1. Thus, the state machine definition generator module 11 may use the weather data as a basis to generate the state machine definition text-file T1.

In another embodiment according to the present invention, the weather data collection platform 7 is a weather station.

In another embodiment, the cloud database 5 also receives an occupant demand response 9 via a wired or wireless approach. The occupant demand response 9 refers to the direct feedback about the system (for example the environment temperature felt such is too cold or too hot etc.) from the occupants located in the operating environment of the air-conditioning equipment 3. In the embodiment, the cloud database 5 may directly collect the occupant demand response 9 from the occupants (for example the occupant provides feedback via an application in a smart phone), or indirectly collect the occupant demand response 9 via the intelligent control system 2, the air-conditioning equipment 3, etc. (for example the occupant provides feedback via the user interface of the air-conditioning equipment 3), and uses the occupant demand response 9 as the reference data D1. Thus, the state machine definition generator module 11 may use the occupant demand response 9 as a basis to generate the state machine definition text-file T1.

Figure 5:
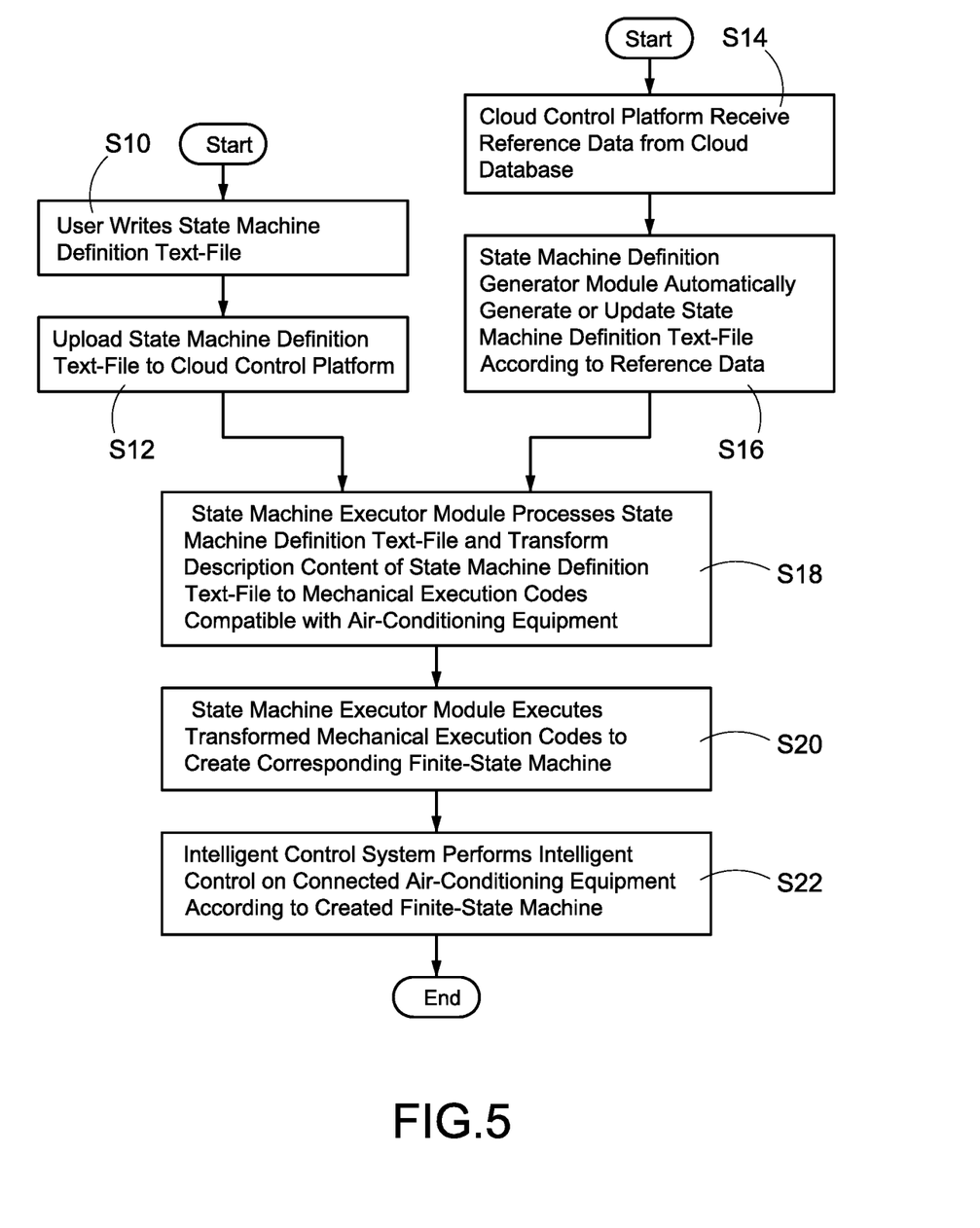
FIG. 5 is a control flowchart according to the first embodiment of the present invention.

FIG. 5 is a control flowchart according to the first embodiment of the present invention. As shown in FIG. 5, when the user wants to customize the finite-state machine of the air-conditioning equipment 3, the user does not need to write or modify the mechanical execution codes (for example the firmware of the air-conditioning equipment 3) of the air-conditioning equipment 3 through program languages. Instead, the user simply needs to write a state machine definition text-file T1 via a user terminal 4 (step S10) and uploads the state machine definition text-file T1 to the cloud control platform 1 (step S12). Specifically, the user writes a XML file, a JSON file or a simple text data file of other formats via a corresponding interface in the user terminal 4 to create the state machine definition text-file T1.

On the other hand, the cloud control platform 1 may also receive the reference data D1 from the cloud database 5 (step S14), and the state machine definition generator module 11 may automatically generate or update the state machine definition text-file T1 according to the reference data D1 (step S16). Thus, the user does not need to write and upload the state machine definition text-file T1 which makes the disclosed control system even more useful.

Next, the state machine executor module (the state machine executor module 12 installed on the cloud control platform 1 or the state machine executor module 21 installed on the intelligent control system 2) processes the state machine definition text-file T1, and transforms the description content of the state machine definition text-file T1 to the mechanical execution codes compatible with the air-conditioning equipment 3 to control (step S18).

Next, the state machine executor module 12 or 21 further executes the transformed mechanical execution codes to create the corresponding finite-state machine F1 (step S20). It should be noted that if the state machine executor module 12 installed on the cloud control platform 1 is in charge for creating the finite-state machine F1, the finite-state machine F1 is then operated in the cloud control platform 1. Similarly, if the state machine executor module 21 installed on the intelligent control system 2 is in charge for creating the finite-state machine F1, the finite-state machine F1 is then operated in the intelligent control system 2.

Lastly, the intelligent control system 2 may perform intelligent control on the connected air-conditioning equipment 3 according to the created finite-state machine F1 (step S22). Therefore, the disclosed intelligent control system 2 may assure that the operations of the air-conditioning equipment 3 meet the finite-state machine defined by the description content of the state machine definition text-file T1.

As mentioned above, the technical advantage provided by the disclosed control system is that the user is allowed to easily create a finite-state machine to make air-conditioning equipment 3 to operate under specific states when specific conditions are met via writing texts simply.

Figure 6A:
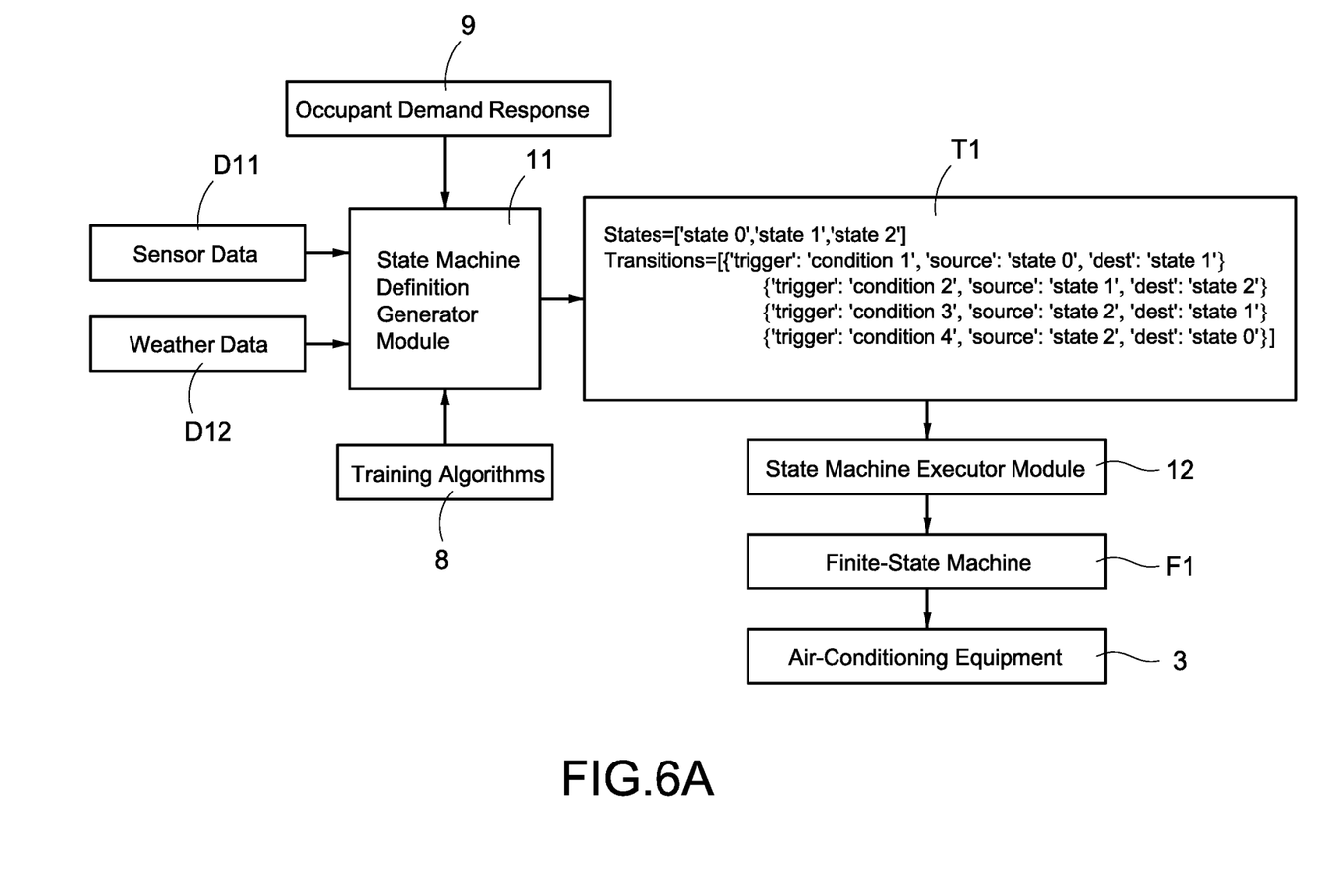
FIG. 6A is a schematic diagram of generating and executing a state machine definition text-file.
Figure 6B:
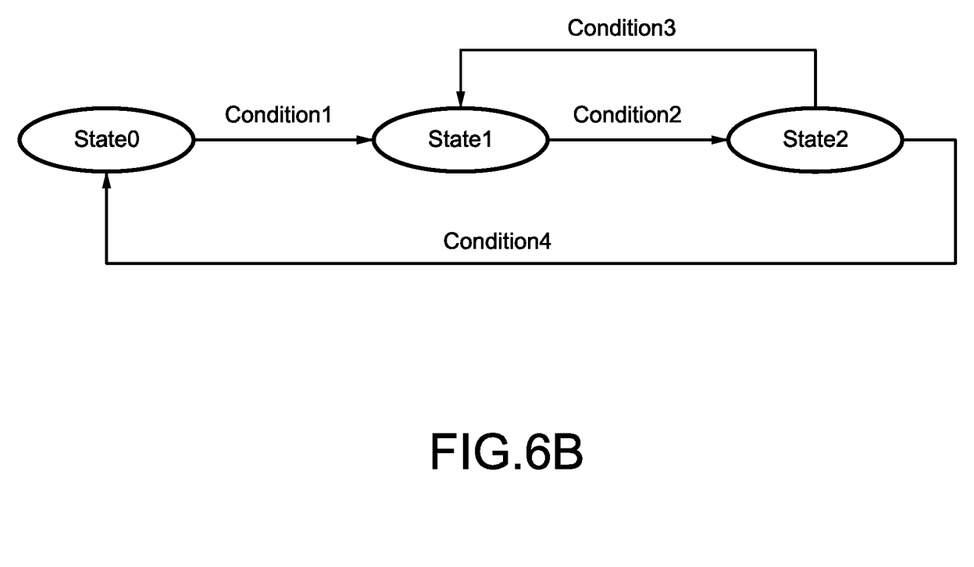

FIG. 6A is a schematic diagram of generating and executing a state machine definition text-file and FIG. 6B is a schematic diagram of a finite-state machine according to the present invention.

As shown in FIG. 6A, the state machine definition text-file T1 includes two major parts, including state columns and transition columns in an embodiment according to the present invention.

In the states columns, an user only needs to simply write a state name of each state (for example three state names used are "state 0", "state 1", and "state 2" in FIG. 6A), wherein each state name respectively corresponds to the functions, modes or states that the air-conditioning equipment 3 may achieve (for example state 0 corresponds to an air supply mode of the air-conditioning equipment 3, state 1 corresponds to an air-conditioning mode of the air-conditioning equipment 3, and state 2 corresponds to the standby mode of the air-conditioning equipment 3).

In the transition columns, the user may write multiple transition items, wherein each transition item respectively includes a source state, a destination state and a trigger condition. When a trigger condition of a transition item is achieved, the operation of the air-conditioning equipment 3 then switches from the defined source state to the defined destination state under the same transition item.

As mentioned above, the state machine definition text-file T1 can be written by the user with the user terminal 4 or automatically generated by the state machine definition generator module 11.

In the embodiment as shown in FIG. 6A, the cloud control platform 1 further includes the training algorithms 8 used for performing on line or off line training of the state machine definition generator module 11. In an embodiment, the training algorithms 8 may include a machine learning algorithm. In another embodiment, the training algorithms 8 may include a rule-based algorithm. Nonetheless, either the machine learning algorithm or the rule-based algorithm are general technical means used in the art and are not repeated hereto.

Via the training with the training algorithms 8, the state machine definition generator module 11 may pre-create multiple generating rules for generating the aforementioned state names and transition items. When obtaining the reference data D1 from the cloud database 5, the state machine definition generator module 11 may automatically generate or update multiple corresponding state names and multiple corresponding transition items according to the reference data D1 and the generating rules, and further generates the corresponding state machine definition text-file T1 according to the multiple generated state names and transition items.

In the embodiment, the reference data D1 may be, for example, the sensor data D11 from the sensor 6, the weather data D12 collected by the weather data collection platform 7, or the occupant demand response 9 directly or indirectly offered by the occupants.

When the state machine definition text-file T1 is completely written or generated, the state machine executor module 12 installed on the cloud control platform 1 or the state machine executor module 21 installed on the intelligent control system 2 may process the state machine definition text-file T1, and transforms the description content of the state machine definition text-file T1 to the mechanical execution codes compatible with the air-conditioning equipment 3 and executes the transformed mechanical execution codes to create a corresponding finite-state machine F1. Thus, the intelligent control system 2 may perform intelligent control on the air-conditioning equipment 3 according to the created finite-state machine F1 to make the operations of the air-conditioning equipment 3 in accordance with the finite-state machine defined by the description content of the state machine definition text-file T1.

In the embodiment, the state machine executor module 12 may create the finite-state machine shown in FIG. 6B after executing the mechanical execution codes transformed from the state machine definition text-file T1 shown in FIG. 6A.

Specifically, the finite-state machine created by the state machine executor module 12 may correspond to each state name and each transition item in the state machine definition text-file T1. In the embodiment shown in FIG. 6B, the finite-state machine includes three state names "state 0", "state 1", and "state 2" and four transition items. Among which, the four transition items include: (1) control the air-conditioning equipment 3 to switch from state 0 to state 1 when the condition 1 is met; (2) control the air-conditioning equipment 3 to switch from state 1 to state 2 when the condition 2 is met; (3) control the air-conditioning equipment 3 to switch from state 2 to state 1 when the condition 3 is met; (4) control the air-conditioning equipment 3 to switch from state 2 to state 0 when the condition 4 is met.

With the present control system, the user may use XML format, JSON format or other lightweight text data format to simply write the above mentioned state names and transition items in the state machine definition text-file T1. The state machine executor modules 12, 21 may process the state machine definition text-file T1 and directly create the finite-state machine which is the same as being written by the program languages (for example C/C++, Java, Python, etc.)

corresponding to the mechanical execution codes of the air-conditioning equipment 3 according to the state names and transition items.

As mentioned above, with the disclosed control system, the user does not need to have the ability of writing the above mentioned program languages and is capable of conveniently creating and modifying the finite-state machine of the air-conditioning equipment 3.

Figure 7:
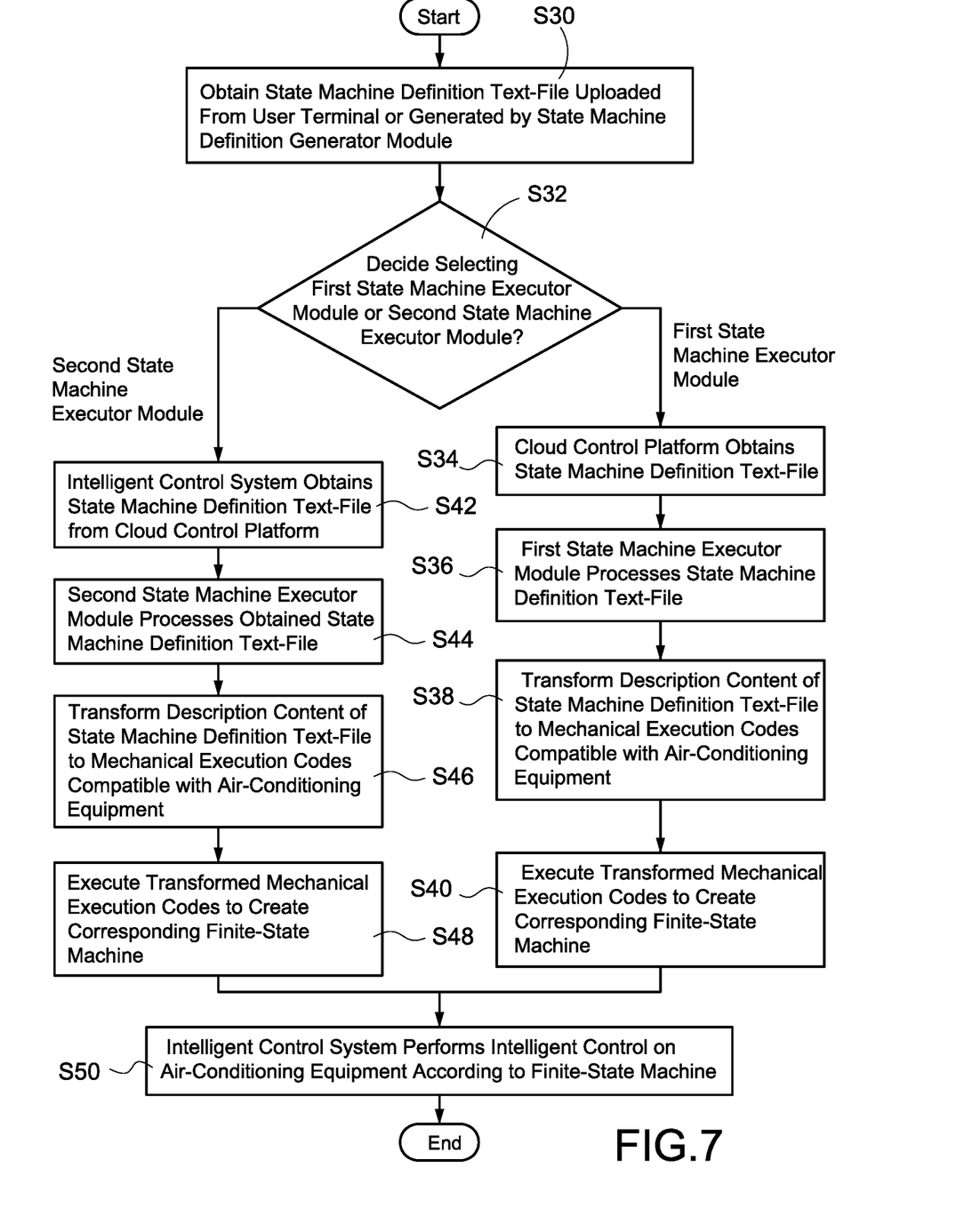
FIG. 7 is a control flowchart according to the second embodiment of the present invention.

FIG. 7 is a control flowchart according to the second embodiment of the present invention. In the embodiment, the cloud control platform 1 first obtains the state machine definition text-file T1 uploaded from the user terminal 4 or generated by the state machine definition generator module 11 (step S30). Next, the cloud control platform 1 may decide using the first state machine executor module installed on the cloud control platform 1 (i.e. the state machine executor module 12) or the second state machine executor module installed on the intelligent control system 2 (i.e. the state machine executor module 21) to process the obtained state machine definition text-file T1 according to the description content of the state machine definition text-file T1 (step S32).

For example, if the finite-state machine defined in a first state machine definition text-file is applicable to different kinds of air-conditioning equipment, the cloud control platform 1 may determine the first state machine executor module to process the first state machine definition text-file and thus users the cloud control platform 1 to operate the corresponding finite-state machine. For another example, if the finite-state machine defined in a second state machine definition text-file is applicable to air-conditioning equipment of a specific model, the cloud control platform 1 may determine the second state machine executor module in the intelligent control system 2 connected to the above air-conditioning equipment to process the second state machine definition text-file and thus uses the intelligent control system 2 to operate the corresponding finite-state machine.

If the determining result in step S32 is that the first state machine executor module in the cloud control platform 1 processes the state machine definition text-file T1, the cloud control platform 1 may obtain the state machine definition text-file T1 (step S34). Next, the first state machine executor module may process the obtained state machine definition text-file T1 (step S36), and transforms the description content of the state machine definition text-file T1 to the mechanical execution codes compatible with the air-conditioning equipment 3 to control (step S38). In addition, the first state machine executor module further executes the transformed mechanical execution codes to create the corresponding finite-state machine F1 (step S40).

If the determining result in step S32 is that the second state machine executor module processes the state machine definition text-file T1, the intelligent control system 2 may obtain the state machine definition text-file T1 from the cloud control platform 1 (step S42), and the second state machine executor module may process the obtained state machine definition text-file T1 (step S44) in order to transform the description content of the state machine definition text-file T1 to the mechanical execution codes compatible with the air-conditioning equipment 3 to control (step S46). In addition, the second state machine executor module further executes the transformed mechanical execution codes to create the corresponding finite-state machine F1 (step S48).

After step S40 or step S48, the intelligent control system 2 may perform intelligent control on the air-conditioning equipment 3 according to the finite-state machine F1 operated in the cloud control platform 1 or the intelligent control system 2 (step S50). Thus, the intelligent control system 2 assures that the operations of the air-conditioning equipment 3 meet user's requirements (i.e., meet the finite-state machine defined in the state machine definition text-file T1).

With the embodiments mentioned above, the disclosed control system may use the cloud control platform 1 to create and operate the finite-state machine of the air-conditioning equipment 3 to achieve the objective of simultaneously operating and maintaining multiple finite-state machines of different electronic apparatuses. In addition, the disclosed control system may alternatively use the intelligent control system 2 to create and operate the finite-state machine of the air-conditioning equipment 3 so as to reduce the loading of the cloud control platform 1.

As the skilled person will appreciate, various changes and modifications can be made to the described embodiment. It is intended to include all such variations, modifications and equivalents which fall within the scope of the present invention, as defined in the accompanying claims.

What is claimed is:

1. A finite-state machine control system for air-conditioning equipment, comprising:
   an air-conditioning equipment;
   a cloud control platform configured for receiving a state machine definition text-file uploaded from a user terminal, wherein the state machine definition text-file has description content, the description content comprises a state column and a transition column, the state column records multiple state names with respect to multiple states, the transition column records multiple transition items, and each of the transition items respectively includes at least a source state, a destination state, and a trigger condition;
   a state machine executor module configured for
      receiving the state machine definition text-file from the cloud control platform,
      compiling the description content of the state machine definition text-file for translating the description content of the state-machine definition text-file into a mechanical execution code which is compatible with the air-conditioning equipment, and
      executing the mechanical execution code for creating a finite state-machine corresponding to the description content according to each state name, each source state, each destination state, and each trigger condition;
   a state machine definition generating module configured for receiving external reference data which is not written by a user, wherein the state machine definition generating module has been pre-trained by a training algorithm and pre-setup multiple rules, and the state machine definition generating module processes the external reference data for automatically generating or updating the state machine definition text-file according to the multiple rules after receiving the reference data; and
   an intelligent control system (ICS) connected to the cloud control platform and the air-conditioning equipment, performing intelligent control on the air-conditioning equipment according to the finite state-machine in order to make the air-conditioning equipment operating in accordance with the description content.

2. The finite-state machine control system of claim 1, wherein the description content records at least a time point, the air-conditioning equipment to be controlled, and at least one control action.

3. The finite-state machine control system of claim 1, wherein the state machine executor module is installed on the cloud control platform, and the intelligent control system performs the intelligent control by reference to the finite-state machine operated in the cloud control platform via a network system.

4. The finite-state machine control system of claim 1, wherein the state machine executor module is installed on the intelligent control system and the intelligent control system obtains the state machine definition text-file from the cloud control platform via a network system.

5. The finite-state machine control system of claim 1, wherein the state machine definition text-file is based on an Extensible Markup Language (XML) format.

6. The finite-state machine control system of claim 1, wherein the state machine definition text-file is based on a JavaScript Object Notation (JSON) format.

7. The finite-state machine control system of claim 1, wherein the state machine definition generating module is installed on the cloud control platform.

8. The finite-state machine control system of claim 7, further comprising a cloud database connected to the cloud control platform which saves the external reference data and provides the external reference data to the cloud control platform.

9. The finite-state machine control system of claim 8, wherein the cloud database is connected to the intelligent control system for receiving sensor data returned by a sensor located surrounding the air-conditioning equipment and regards the sensor data as the external reference data.

10. The finite-state machine control system of claim 8, wherein the cloud database is connected to a weather data collection platform for receiving weather data and regards the weather data as the external reference data.

11. The finite-state machine control system of claim 10, wherein the weather data collection platform is a weather station or a Meteorological Bureau website.

12. The finite-state machine control system of claim 7, wherein the training algorithm is a machine learning algorithm or a rule-based algorithm.

13. The finite-state machine control system of claim 1, wherein the intelligent control system and the air-conditioning equipment are installed on a local end and connected to the cloud control platform via a network system.

14. The finite-state machine control system of claim 13, wherein the state machine executor module further comprises a first state machine executor module installed on the cloud control platform and a second state machine executor module installed on the intelligent control system, the cloud control platform determines whether the state machine definition text-file is processed by the first state machine executor module or the second state machine executor module according to the description content of the state machine definition text-file for creating the finite-state machine according to the description content of the state machine definition text-file.

* * * * *